March 19, 1946.   F. E. TUTTLE   2,396,902
STEREO SYSTEM
Filed Sept. 2, 1943
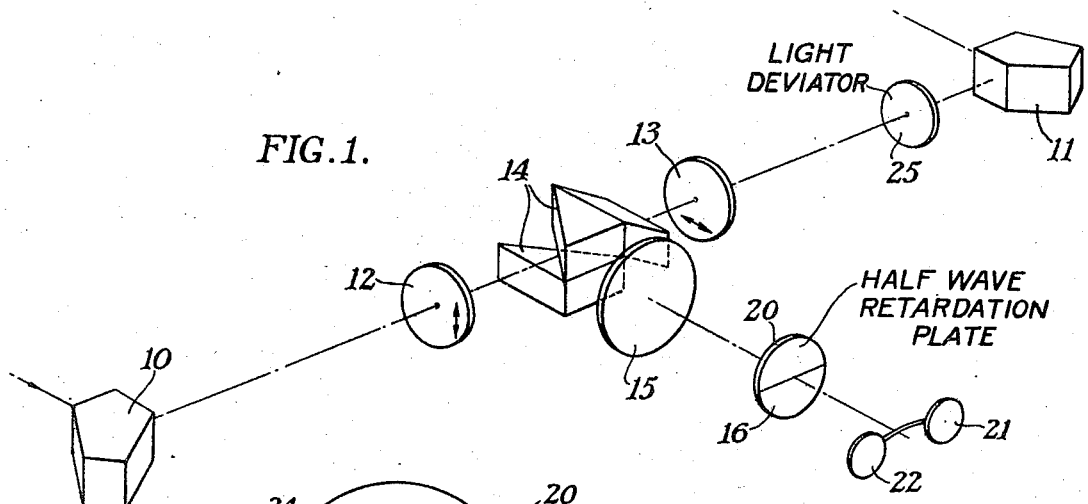
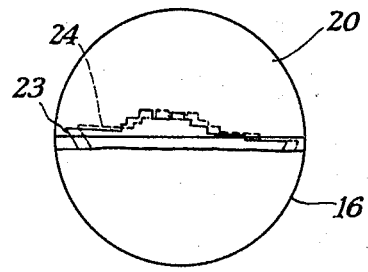
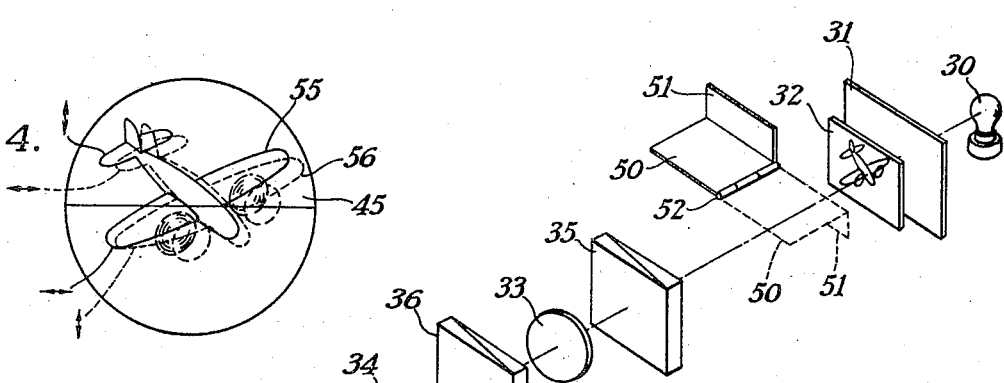
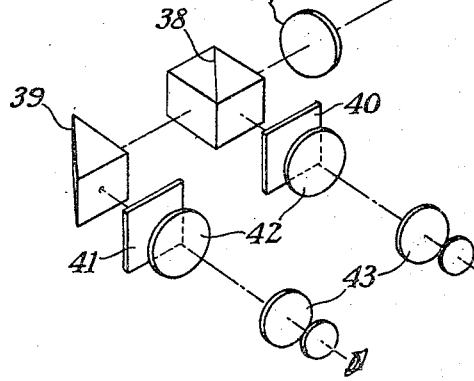
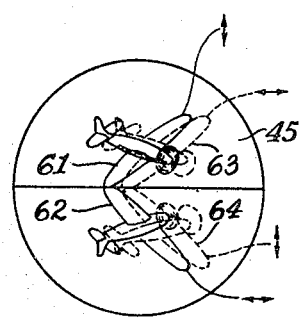
FORDYCE E. TUTTLE
INVENTOR
BY
ATT'Y & AG'T Patented Mar. 19, 1946

2,396,902

UNITED STATES PATENT OFFICE 2,396,902

STEREO SYSTEM

Fordyce E. Tuttle, Rochester, N. Y., assignor to Eastman Kodak Company, Rochester, N. Y., a corporation of New Jersey Application September 2, 1943, Serial No. 500,906

7 Claims. (Cl. 88—20)

This invention relates to stereo optical systems such as used in range finders or in testing and training stereo vision.

It is the object of the invention to provide means for converting from ortho stereo to pseudo stereo conditions or vice versa or to provide a system giving both ortho and pseudo stereo vision. The invention is particularly useful in the stereo acuity tester and trainer described in copending applications Serial No. 500,944 by Wittel, Koch and Boon and Serial No. 500,943 by MacNeille and Koch, both filed concurrently herewith. One preferred embodiment of the invention is used in combination with a preferred feature described in the MacNeille and Koch case.

According to the present invention a stereo optical system is made up with some means for forming polarized images of the same subject in an image plane with their vibration axes mutually at right angles. The images may be identical or may be stereo separations; they may be superimposed or they may be separated so that when viewed stereoscopically they have an apparent depth at a distance different from that of the image plane. In general, some means are provided for stereoscopic viewing of the images such as by a binocular viewing system in which polarizing filters mutually at right angles are used respectively in the right and left eye beams, the filters being oriented to select the images. According to the invention there is placed over at least part of the image plane, means for rotating the vibration axes of the polarized images through a right angle. That is, the axes are rotated when the light forming the image passes through the rotating plate either before the image is formed, after the image is formed or just as the image is formed. That is, the rotating plate is near the image plane and the images effectively as viewed have their vibration axes rotated through a right angle. The rotating plate may be an optical active material of proper thickness or may be a halfwave retardation plate such as a sheet of Cellophane of proper thickness. The term "halfwave retardation plate" is here used to include any birefringent plate which puts the ordinary and extraordinary rays a halfwave out of phase. The thinnest of such plates is preferable since it has the least coloring, but any odd multiple of this thickness, provided it is not too thick, could be used.

The halfwave plate rotates both of the image vibration axes through a right angle, and hence, interchanges the polarization of the images in one part of the image plane with respect to those in the other part. When the images are viewed through selectively polarizing filters, the stereo effect in one part of the field is ortho and in the other part is pseudo. Rotation of the viewing filters over the right and left eyes through 90° will interchange the parts which are ortho and pseudo.

In the stereo trainer described in the copending applications mentioned above the polarized images are formed by a transilluminated target, an objective, and birefringent means for splitting the resulting images into two polarized at right angles to each other. If a reflecting surface is placed horizontally on the optic axis immediately in front of the target, the effective target is made up of ½ of the original target and a mirror image of this half. When the halfwave plate in the image plane according to the present invention covers only the part of the plane corresponding to one or other of these parts of the effective target, the total effect corresponds to an ortho-pseudo stereo range finder. In fact, the present invention can be used in any stereo range finder having an invert field, to convert it to an ortho-pseudo stereo range finder. In this case the halfwave retardation plate is placed over one or other of the halves of the range finder field and polarizing filters are placed in the light beam from the target.

The invention will be fully understood from the following description of two examples thereof when read in connection with the accompanying drawing, in which:

Fig. 1 illustrates a simple ortho-pseudo-stereo range finder incorporating the invention;

Fig. 2 shows the field of view in the instrument shown in Fig. 1;

Fig. 3 shows a stereo trainer incorporating the invention; a stereo trainer is an instrument for testing and training, i. e. improving stereo vision;

Fig. 4 shows the field of view through the instrument;

Fig. 5 shows the field of view through an alternative arrangement of the instrument shown in Fig. 3 corresponding to an ortho-pseudo-stereo range finder with invert field.

In Fig. 1 light from a distant object being ranged is received by penta prisms 10 and 11 and directed through polarizing filters 12 and 13 with their vibration axes mutually at right angles. The light beams are then reflected by crossed prisms 14 through an objective 15 to be brought to focus in an image plane 16. This results in a pair of images 23 and 24 as shown in Fig. 2 which are polarized mutually at right angles. These images may be viewed through any selective binocular viewing system such as polarizing glasses 21 and 22.

In the absence of any halfwave retardation plate, the images 23 and 24 would be seen respectively by the right and left eyes, hence, would appear at some distance from the image plane 16. If the light deviator 25 were adjusted to bring the two images 23 and 24 into coincidence, the apparent distance would be the same as that of the image plane 16 and the adjustment of this apparent image distance could be made against a reticle located in the image plane 16. This would be a stereo range finder. In the absence of the glasses 21 and 22 it would be satisfactory as a simple coincidence range finder.

According to the invention, however, a halfwave retardation plate 20 covers half of the image plane 16 so that in the upper half of this image plane the right and left eyes see the images opposite to those which they see in the lower half. Suppose, for example, that we call the stereo vision of the upper half of the images 23 and 24 ortho-stereo so that the upper half of the boat appears behind the image plane 16. In this case the lower half would give a pseudo-stereo effect and the boat would appear to be in front of the image plane. The well known and striking effect of ortho-pseudo-stereo range finding would be immediately evidenced and the operator could match the upper and lower halves of the boat so as to appear at the same distance by adjusting the light deviator 25 until the images 23 and 24 are in actual coincidence. Since the actual size of the image doesn't change during this operation it appears to grow as the apparent distance increases and appears to shrink as the apparent distance decreases. The light deviator 25 is of course calibrated to give the range when depth coincidence has been thus established.

In Fig. 3 light from a lamp 30 through a diffusing screen 31 illuminates a target 32 so that an image thereof is formed by an objective 33 in an image plane 34. This image is split into two images polarized at right angles by means of Wollaston prisms 35 and 36, at least one of which is adjustably axial as described in the above-mentioned applications to vary the separation of the polarized images, and hence, to vary their apparent distance from the observer. These images are relayed by lenses 37 and 42 to the image planes of eyepieces 43. Between the lenses 37 and 42 the light is collimated and is split by a beam splitter made up of a semi-transparent surface 38 and a reflecting surface 39. To prevent the left eye from seeing the right eye image and vice versa, polarizing filters 40 and 41 are provided with their vibration axes mutually at right angles and matching that of the images in the primary image plane 34. According to the invention a halfwave retardation plate 45 covers half of the image plane 34 so that in this half the vibration axes of the images are at right angles, i. e. interchanged with respect to the axes in the lower half of the field. This condition is shown in Fig. 4 in which one of the images 55 is shown by solid lines and the other image 56 is shown by broken lines. In the upper half of the field the vibration axis of the image 55 is vertical whereas that of the image 56 is horizontal. In the lower half of the field the vibration axes are interchanged in azimuth all as shown by double headed arrows in this Fig. 4.

This invention may be combined with a feature of the MacNeille and Koch invention discussed above to give in a stereo trainer the same effect as is obtained in an ortho-pseudo-stereo range finder. To do this a mirror 50 and a shield 51 are mounted rotatable about hinges 52 so that the mirror 50 is positionable in a horizontal plane on the optic axes of the system immediately in front of the target 32. Thus the upper half of this target 32 and its mirror image reflected by the mirror 50 constitutes the effective target. The result is shown in Fig. 5 which illustrates an invert field ½ of which gives ortho-stereo vision and the other half of which gives pseudo-stereo vision. The matching of these fields is done as before by adjusting the instrument until the images appear to be at the same distance, which occurs only when the solid line images 61 and 62 are in coincidence with the broken line images 63 and 64 hence only at that time do the pair at the upper half of the field form a stereo image at an apparent distance equal to that in the lower half of the field.

Having thus described the preferred forms of my invention, I wish to point out that it is not limited to these structures but is of the scope of the appended claims.

What I claim as new and desire to secure by Letters Patent of the United States is:

1. A stereo optical system comprising means for forming polarized images of the same subject in an image plane with their vibration axes mutually at right angles, means including polarizing filters for stereoscopic viewing of the images respectively by the right and left eyes and, means over only part of and near the image plane, for rotating through a right angle the vibration axes of the polarized images effectively as viewed, the other part of the image plane having images with the axes oriented as formed whereby the directions of polarization of the images in one part of the plane are interchanged in the other part.

2. An ortho-pseudo-stereo optical system comprising means for forming two polarized images of the same subject in an image plane with their vibration axes mutually at right angles and, a transparent layer over part of and near the image plane, having the power to rotate a plane of polarization 90°, the other part of the image plane having images with the axes oriented as formed, and polarizing means with portions respectively parallel to said axes located to receive light from the images and to differentiate between the images.

3. An ortho-pseudo-stereo optical system comprising means for forming two polarized images of the same subject in an image plane with their vibration axes mutually at right angles and a halfwave retardation plate over part of and near the image plane, the other part of the image plane having images with their axes as formed, whereby the directions of polarization of the images in one part of the plane are interchanged in the other part, and polarizing means with portions respectively parallel to said axes located to receive light from the images and to differentiate between the images.

4. An ortho-pseudo-stereo optical system comprising means for forming two polarized images of the same subject in an image plane with their vibration axes mutually at right angles, means including two polarizing filters mutually at right angles and respectively in each eye beam for stereoscopic viewing of the images and a half wave retardation plate over part of and near the image plane, the other part of the image plane having images with their axes as formed, whereby in one part of the plane the stereo effect is pseudo and, in the other part, is ortho.

5. An ortho-pseudo-stereo optical system comprising a transilluminated target, an objective for forming an image of the target in a primary image plane, birefringent means in series with the objective for splitting the image into two images polarized at right angles to each other, means including two polarizing filters mutually at right angles and respectively in each eye beam for stereoscopic viewing of the images and a halfwave retardation plate over part of and near the image plane, the other part of the image plane having images with their axes as formed, whereby in one part of the plane the stereo effect is pseudo and, in the other part, is ortho.

6. An optical system according to claim 5 including a reflecting surface on the optic axis of the objective in front of and near the target and means for cutting off light from the part of the target back of the reflecting surface whereby the other part of the target together with its mirror image in the reflecting surface forms the effective target, said halfwave retardation plate covering the part of the image plane corresponding to one of said parts of the target only.

7. An ortho-pseudo-stereo optical system comprising means for forming a pair of polarized images of the same subject with their vibration axes mutually at right angles in one part of an image plane and in the other part, a mirror image of said images, means for stereoscopic viewing of the images by the right and left eye respectively through polarizing filters oriented for stereo selection and a halfwave retardation plate over one of said parts of and near the image plane, the other part of the image plane having images with their axes as formed, whereby in one part of the plane the stereo effect is pseudo and, in the other part, is ortho.

FORDYCE E. TUTTLE.